United States Patent [19]

Reisch

[11] Patent Number: 4,985,491

[45] Date of Patent: Jan. 15, 1991

[54] POLYURETHANE SEALANTS MADE USING HIGH MOLECULAR WEIGHT POLYOLS PREPARED WITH DOUBLE METAL CYANIDE CATALYSTS

[75] Inventor: John W. Reisch, Guilford, Conn.

[73] Assignee: Olin Corporation, Cheshire, Conn.

[21] Appl. No.: 417,356

[22] Filed: Oct. 5, 1989

[51] Int. Cl.$^5$ ............................................. C08L 75/04
[52] U.S. Cl. ...................................... 524/875; 528/59; 528/60; 528/61; 528/64; 528/65
[58] Field of Search ............... 524/875; 528/59, 60, 528/61, 64, 65

[56] References Cited

U.S. PATENT DOCUMENTS

| | | | |
|---|---|---|---|
| 3,829,505 | 8/1974 | Herold | 260/611 B |
| 3,941,849 | 3/1976 | Herold | 260/607 |
| 4,335,188 | 6/1982 | Igi et al. | 428/458 |
| 4,355,188 | 10/1982 | Herold et al. | 568/620 |
| 4,472,560 | 9/1984 | Kuyper et al. | 526/120 |
| 4,477,589 | 10/1984 | van der Hulst et al. | 502/169 |

*Primary Examiner*—Maurice J. Welsh
*Attorney, Agent, or Firm*—Dale Lynn Carlson

[57] ABSTRACT

This invention relates to a method of fabricating a polyurethane sealant composition employing a polyether triol having a molecular weight of between about 5,000 and about 30,000 and having a level of end group unsaturation of no greater than 0.04 milliequivalents per gram of triol, wherein the triol is fabricated in the presence of a double metal cyanide catalyst. The triol is reacted, alone or in admixture with a diol, with a polyisocyanate to produce an isocyanate-terminated prepolymer. The prepolymer is then chain-extended to produce the desired sealant.

12 Claims, No Drawings

POLYURETHANE SEALANTS MADE USING HIGH MOLECULAR WEIGHT POLYOLS PREPARED WITH DOUBLE METAL CYANIDE CATALYSTS

The use of double metal cyanide catalysts in the preparation of high molecular weight polyols is well-established in the art. For example, U.S. Pat. No. 3,829,505, assigned to General Tire & Rubber Company, discloses the preparation of high molecular weight diols, triols etc., using these catalysts. The polyols prepared using these catalysts can be fabricated to have a higher molecular weight and a lower amount of end group unsaturation than can be prepared using commonly-used KOH catalysts. The '505 patent discloses that these high molecular weight polyol products are useful in the preparation of nonionic surface active agents, lubricants and coolants, textile sizes, packaging films, as well as in the preparation of solid or flexible polyurethanes by reaction with polyisocyanates.

Heretofore, the use of these high molecular weight polyols made with double metal cyanide catalysts in the preparation of sealants, particularly flexible sealants characterized by high tensile strength and low compression set values, has not been known based upon the knowledge of the present inventor. The discovery of such sealants would be highly desired by the sealant manufacturing community.

In one aspect, the present invention relates to a polyurethane sealant composition made by reacting an isocyanate-terminated prepolymer with a chain-extender, the isocyanate-terminated prepolymer being the reaction product of a polyisocyanate and a polyether triol having a molecular weight of between about 5,000 and about 30,000, said triol having an end group unsaturation level of no greater than 0.04 milliequivalents per gram of triol.

In another aspect, the present invention relates to a polyurethane sealant composition comprising a chain-extended reaction product of at least one polyisocyanate with a polyol mixture containing a polyether diol having a molecular weight of between about 500 and about 15,000 and a polyether triol having a molecular weight of between about 5,000 and about 30,000, said triol having an end group unsaturation level of no greater than 0.04 milliequivalents per gram of polyol, thereby producing an isocyanate-terminated prepolymer, said prepolymer being reacted with a chain-extender to produce said chain-extended reaction product.

In yet another aspect, the present invention relates to a method of fabricating a polyurethane sealant composition which comprises the steps of:

(a) fabricating a polyether triol having a molecular weight of between about 5,000 and about 30,000 and having a level of end group unsaturation of no greater than 0.04 milliequivalents per gram of triol, said triol being fabricated in the presence of a double metal cyanide catalyst, (b) fabricating a polyether diol having a molecular weight between 500 and 15,000, with the proviso that if said diol has a molecular weight of greater than 3,000, then the diol is fabricated using a double metal cyanide catalyst and the diol has an end group unsaturation level of no greater than 0.04 milliequivalents per gram of diol, (c) mixing said triol with said diol to provide a polyol mixture, (d) reacting said polyol mixture with a polyisocyanate to produce an isocyanate-terminated prepolymer, and (e) reacting said isocyanate-terminated prepolymer with a chain extender or allowing said prepolymer to react with moisture in order to produce a chain-extended polyurethane sealant.

In still another aspect, the present invention encompasses a modified method wherein steps (b) and (c) are omitted, and the polyether triol of step (a) is reacted with the polyisocyanate of step (d) to produce a prepolymer.

The polyurethane isocyanate-terminated prepolymer that is utilized according to the invention is prepared by reacting an organic polyisocyanate with a polyalkylene ether triol or a combination of a polyalkylene ether diol in an equivalent ratio of NCO/OH from about 1.02/1 to about 5/1, using standard procedures, to yield an isocyanate-terminated prepolymer of controlled molecular weight. Preferably, the NCO/OH ratio ranges from about 1.3/1 to about 3/1. The reaction may be accelerated by employing a catalyst; common urethane catalysts are well known in the art and include numerous organometallic compounds as well as amines, e.g., tertiary amines and metal compounds such as lead octoates, mercuric succinates, stannous octoate or dibutyltin dilaurate may be used. Any catalytic amount may be employed; illustratively, such amount varies, depending on the particular catalyst utilized, from about 0.01 to about 1 percent by weight of the polyurethane prepolymer.

Polyether triols are the preferred triol reactant. Suitable polyether triols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether triol reactant includes the following and mixtures thereof: the aliphatic triols such as glycerol, propoxylated glycerol adducts, trimethylolpropane, triethylolpropane, trimethylolhexane, and the like.

A preferred group of polyhydric initiators for use in preparing the polyether triol reactant is one which comprises triols such as glycerol, propoxylated glycerol adducts, trimethylolpropane and the like.

The polyether diols are prepared by an analogous reaction of alkylene oxide, or mixture of alkylene oxides with a polyhydric initiator. In this case the initiator is a diol such as ethylene glycol, 1,3-propylene glycol, dipropylene glycol, butylene glycols, butane diols, pentane diols, and the like.

A preferred group of polyhydric initiators for use in preparing the polyether diol reactant is one which comprises diols such as ethylene glycol, diethylene glycols, propylene glycol, dipropylene glycol, or water.

The alkylene oxide-polyhydric initiator condensation reaction is preferably carried out in the presence of a double metal cyanide catalyst. Without wishing to be bound by any particular theory, it is speculated by the present inventor that unsaturated end groups result in monofunctional species that act as chain stoppers in elastomer formation. In polyol synthesis with KOH catalysis the unsaturation formed increases as a direct function of equivalent weight. Eventually conditions are established wherein further propylene oxide addition fails to increase the molecular weight. In other words the use of alkali catalysts to produce high molecular weight, hydroxy terminated polyoxypropylene ethers results in a substantial loss in hydroxy functionality. With double metal cyanide catalysis much less unsaturation is formed allowing higher equivalent weight polyols to be prepared.

The double metal cyanide complex class catalysts suitable for use and their preparation are described in U.S. Pat. Nos. 4,472,560 and 4,477,589 to Shell Chemical Company and U.S. Pat. Nos. 3,941,849 and 4,335,188 to General Tire & Rubber Company. The teachings of the foregoing patents are incorporated herein by reference.

One double metal cyanide complex catalyst found particularly suitable for use is a zinc hexacyanometallate of formula:

$$Zn_3[M(CN)_6]_2 \cdot xZnCl_2 \cdot yGLYME \cdot zH_2O$$

wherein M may be Co(III), or Cr(III) or Fe(II) or Fe(III); x, y, and z may be fractional numbers, integers, or zero and vary depending on the exact method of preparation of the complex.

Any suitable organic polyisocyanate, or mixture of polyisocyanates, may be used in the polyurethane prepolymer formation. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate, xylene diisocyanate, 3,3'-bistoluene4,4'-diisocyanate, hexamethylene diisocyanate, naphthalene-1,5-diisocyanate, the polymeric isocyanates such as polyphenylene polymethylene isocyanate, mixtures thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20. The amount of polyisocyanate employed in the prepolymer formation should be sufficient to provide at least about 1.02 to about 5 NCO groups per hydroxy group in the reaction system. Preferably, polyisocyanate is used in a proportion to provide about 1.3 to about 3 NCO groups per each hydroxy group.

The prepolymer is chain extended with a chain extender, as is well known to those in the polyurethane art. These chain extenders are typically diols such as ethylene glycol, butane diol, hexane diol, propylene glycol, bisphenol A, or polyalkylene oxide polyols with molecular weights between 200-4000. The chain extenders can also be triols such as glycerine, trimethylol propane, or propoxylated adducts of glycerine or trimethylol propane or amines like diethyltoluene diamine, ethylene diamine, triisopropyl amine, methylene bis(orthochloroaniline), and the like or the prepolymer could be moisture cured with water. The chain extension can be conducted either in situ during the prepolymer formation or in a separate reaction step.

The polyurethanes of the present invention may be made by the prepolymer process or the one-shot process. Urethane forming catalysts can be used as well as antioxidants or other antidegradants. The sealant-forming components may be mixed with the usual compounding ingredients, e.g. plasticizers, adhesion promoters, fillers and pigments like clay, silica, fumed silica, carbon black, talc, phthalocyanine blue or green, $TiO_2$, U-V absorbers, $MgCO_3$, $CaCO_3$ and the like. The compounding ingredients, such as fillers, are suitably employed in the sealant in an amount of between 0 and about 75 weight percent based upon the weight of the sealant.

As used herein, the term "molecular weight" is intended to designate number average molecular weight.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLE 1

A. Evaluation of Sealants

Polyols containing very low unsaturation levels that were prepared with double metal cyanide catalysts were evaluated in polyurethane sealants. Two polyols containing low unsaturation levels were evaluated, L.U. 5800 (5800 MW triol) and L.U. 10,000 (10,000 MW triol). A control was run with POLY-G(R) 85-28, a commercial product prepared with KOH catalysis. The compositions of the polyols that were evaluated in sealants are presented in Table 1.

In Table 1 the measured unsaturation levels of the polyols in milliequivalents per gram is used to calculate the mole percent monol. The control POLY-G 85-28 has significantly lower functionality and higher mole % monol then the products prepared with double metal cyanide catalysts.

The polyols were evaluated in polyurethane sealants by blending the various triols with POLY-G 20-56 (2000 molecular weight propyleneoxide diol) in an equimolar amount and preparing 2.5% free NCO TDI prepolymers. Blends of triols and diols are commonly used to make polyurethane sealants. The prepolymers were extended with POLY-G 20-56 to make one set of sealants, and with POLY-G 20-112 (1000 molecular weight propyleneoxide diol) to make another set of sealants. Each of the sealants were filled with 20 wt. % talc.

The physical properties of the sealants extended with POLY-G(R) 20-112 are presented in Table 2. The control prepared with POLY-G 85-28 was very soft (Shore A=5) and it had good elongation (1700% without breaking) but it had very low tensile strength (13 psi) and it had relatively high compression set (46%). The sealant prepared with the low unsaturation 10,000 molecular weight polyol exhibited superior properties. Like the control this sealant achieved 1700% elongation without breaking, but it had much higher tensile strength (110 psi vs 13 psi) and significantly lower compression set (15% vs 46%).

In the softer formulation where the three prepolymers were extended with POLY-G 20-56 the control, which was prepared with POLY-G 85-28 was very soft (Shore A=2) and it did not maintain its integrity, therefore its physical properties could not be obtained. In this formulation the low unsaturation 5800 molecular weight triol exhibited superior properties (see Table 3). The sealant prepared with the 5800 molecular weight triol had excellent elongation (1700% without breaking) and high tensile strength 155 psi and very low compression set (5.8%).

In summary as outlined above, the low unsaturation 10,000 molecular weight polyol in the first formulation and the low unsaturation level 5800 mw polyol in the second formulation produced sealants with superior properties. The sealants exhibited high elongation and high tensile strength with low compression set. This combination of properties was not achieved in the sealant made using the conventional 6,200 molecular weight polyol (POLY G 85-28).

B. Experimental Procedure

Prepolymer Preparation: TDI-80 (83.3g, 87.1 eq. wt., 0.956 eq) was added to a flask under $N_2$ and heated to 60° C. POLY-G 85-28 (500 g, eq. wt. 2093, 0.239 eq) and POLY-G 20-56 (238g, 998 eq. wt., 0.238 eq) were added over a period of 1 hour. The mixture was stirred and heated to 80° C. for 5 hours. The % free NCO was measured and found to be 2.60%.

Preparation of Sealant: The TDI/85-28 prepolymer (150g, 0.0929 eq), and POLY-G 20-112 (44.2g 0.0882 eq), and Talc MP 12-50 (Pfizer) 48.5g and surfactant SF-1080 (0.30g) were blended in a high speed mixer for several minutes. The mixture was degassed and T-10 catalyst (stannous octoate) 0.50g was added. The mixture was stirred under vacuum for 2 minutes and then poured between glass plates with a ⅛" spacer and cured at 70° C. for 4 hours. The sealant was aged at 20° C. and 50% relative humidity for one week before testing.

Analogous procedures were followed to fabricate sealants using the L.U. 5800 and L.U 10,000 polyols.

TABLE 1

Composition of EO Capped Polypropylene Oxide Triols

| Polyol | % EO | OH # | % OH | Unsat. (meq/g) | monol (mole %) |
|---|---|---|---|---|---|
| Poly G 85-28 | 13 | 26.8 | 0.812 | 0.095 | 42.6 |
| L.U. 5800 | 12 | 29.0 | 0.879 | 0.018 | 5.2 |
| L.U. 10,000 | 10 | 16.8 | 0.509 | 0.022 | 19.2 |

TABLE 2

Physical Properties of Talc Filled Polyurethane Sealants

| Triol | Tensile 300% Elong. | Tensile psi | Elong %* | Modulus psi | Comp. Set % | Shore A Hardness |
|---|---|---|---|---|---|---|
| POLY G 85-28 | 0.6 | 13.3 | 1700 | 17 | 46 | 5 |
| L.U. 5800 | 101 | 211 | 760 | 92 | 4 | 30 |
| L.U. 10,000 | 28 | 110 | 1700 | 48 | 15 | 15 |

Formulation: Triol was blended with equimolar amount of POLY G 20-56 and mixed with TDI to form 2.5% NCO prepolymer. Prepolymer was extended with POLY G 20-112 and filled with 20 wt. % talc.
*Note:
1700% elongation indicates no break.

TABLE 3

Physical Properties of Talc Filled Polyurethane Sealants

| Tensile | Tensile 300% Elong | Tensile psi | Elong- % | Modulus psi | Comp. Set % | Shore A Hardness |
|---|---|---|---|---|---|---|
| POLY G 85-28 | Too soft to test, no integrity | | | | | 2 |
| L.U. 5800 | 34 | 155 | 1700 | 59 | 6 | 17 |
| L.U. 10,000 | 2 | 16 | 1700 | 21 | 48 | 5 |

Formulation: Triol was blended with equimolar amount of POLY G 20-56 and mixed with TDI to form extended NCO prepolymer. Prepolymer was extended with POLY-G 20-56 and filled with 20 wt. % talc.
Note:
1700% elongation indicates no break.

EXAMPLE 2

Sealants were prepared with another formulation in which various triols were allowed to react with TDI (without any diol in the reaction mixture) to form 2.5% free NCO prepolymers. The prepolymers were then extended with POLY G 20-56 and filled with 20 wt. % talc to form the sealants. Recall that in the previous formulations disclosed the triols were blended with equimolar amounts of diols to form the prepolymers. In this formulation the prepolymers were prepared with no diol. The physical properties of the sealants are presented in Table 4. As in the earlier formulations the sealants that were prepared with the high molecular weight low unsaturation level polyols have much higher tensile strength than the control, which was prepared with POLY-G 85-28. The sealant that was prepared with the low unsaturation level 10,000 molecular weight triol exhibited excellent elongation (1700% without breaking vs. 1490% at break for the control) and had twice the tensile strength of the control (207 psi vs. 105 psi).

TABLE 4

Physical Properties of Talc Filled Polyurethane Sealants

| Triol | Tensile 300% Elong | Tensile Break | Elong- % | Modulus- psi | Comp. Set % | Shore A Hardness |
|---|---|---|---|---|---|---|
| POLY-G(R) 85-28 | 21 | 105 | 1490 | 42 | 6 | 12 |
| L.U. 6000 | 133 | 221 | 600 | 101 | 0 | 30 |

TABLE 4-continued

| | Physical Properties of Talc Filled Polyurethane Sealants | | | | | |
|---|---|---|---|---|---|---|
| Triol | Tensile 300% Elong | Tensile Break | Elong-% | Modulus-psi | Comp. Set % | Shore A Hardness |
| L.U. 10,000 | 51 | 207 | 1700 | 20 | 6 | 20 |

Formulation: Triol was allowed to react with TDI to form 2.5% free NCO prepolymers. Prepolymers were extended with POLY-G(R) 20-56 and filled with 20 wt. % talc to form sealants.
Note:
1700% elongation is the maximum extension of the instron and the sealant prepared with L.U. 10,000 did not break.

What is claimed is:

1. A polyurethane sealant composition made by reacting an isocyanate-terminated prepolymer with a chain extender, said isocyanate-terminated prepolymer being the reaction product of a polyisocyanate and a polyether triol having a molecular weight of between about 5,000 and about 30,000, said triol having an end group unsaturation level of no greater than 0.04 milliequivalents per gram of triol.

2. A polyurethane sealant composition comprising a chain-extended reaction product of at least one polyisocyanate with a polyol mixture containing a polyether diol having a molecular weight of between about 500 and about 15,000 and a polyether triol having a molecular weight of between about 5,000 and about 30,000, said triol and diol having end group unsaturation levels of no greater than 0.04 milliequivalents per gram of polyol, thereby producing an isocyanate-terminated prepolymer, said prepolymer being reacted with a chain-extender to produce said chain-extended reaction product.

3. A method of fabricating a polyurethane sealant composition which comprises the steps of:
   (a) fabricating a polyether triol having a molecular weight of between about 5,000 and about 30,000 and having a level of end group unsaturation of no greater than 0.04 milliequivalents per gram of triol, said triol being fabricated in the presence of a double metal cyanide catalyst,
   (b) fabricating a polyether diol having a molecular weight between 500 and 15,000, with the proviso that if said diol has a molecular weight of greater than 3,000, then the diol is fabricated using a double metal cyanide catalyst and the diol has an end group unsaturation level of no greater than 0.04 milliequivalents per gram of diol,
   (c) mixing said triol with said diol to provide a polyol mixture,
   (d) reacting said polyol mixture with a polyisocyanate to produce an isocyanate-terminated prepolymer, and
   (e) reacting said isocyanate-terminated prepolymer with a chain extender or allowing said prepolymer to react with moisture in order to produce a chain-extended polyurethane sealant.

4. The composition of claim 1 which additionally contains at least one compounding ingredient.

5. The composition of claim 4 wherein said compounding ingredient is selected from the group consisting of plasticizers, uv stabilizers, adhesion promoters, fillers and pigments.

6. The composition of claim 4 wherein said compounding ingredient is employed in an amount of between 0 and about 75 weight percent based upon the total weight of the composition.

7. The composition of claim 2 which additionally contains at least one compounding ingredient.

8. The composition of claim 7 wherein said compounding ingredient is selected from the group consisting of plasticizers, uv stabilizers, adhesion promoters, fillers and pigments.

9. The composition of claim 7 wherein said compounding ingredient is employed in an amount of between 0 and about 75 weight percent based upon the total weight of the composition.

10. The composition of claim 3 wherein said sealant composition additionally contains at least one compounding ingredient.

11. The composition of claim 10 wherein said compounding ingredient is selected from the group consisting of plasticizers, uv stabilizers, adhesion promoters, fillers and pigments.

12. The composition of claim 10 wherein said compounding ingredient is employed in an amount of between 0 and about 75 weight percent based upon the total weight of the composition.

* * * * *

UNITED STATES PATENT AND TRADEMARK OFFICE
Certificate

Patent No. 4,985,491             Patented: Jan. 15, 1991

On petition requesting issuance of a certificate for correction of inventorship pursuant to 35 USC 256, it has been found that the above-identified patent, through error and without any deceptive intent, improperly sets forth the inventorship.

Accordingly, it is hereby certified that the correct inventorship of this patent is John W. Reisch and Robert C. Hire.

Signed and Sealed this Seventeenth Day of December, 1991.

JOHN KIGHT, III

*SPE, Art Unit 1503*